United States Patent
Dinescu (10) Patent No.: US 11,407,924 B2
(45) Date of Patent: Aug. 9, 2022

(54) DIGITALLY PRODUCED LABEL TRANSFER USING SELECTIVE LASER SINTERING (SLS) METHODS

(71) Applicant: AVERY DENNISON RETAIL INFORMATION SERVICES LLC, Mentor, OH (US)

(72) Inventor: Liviu Dinescu, Huntersville, NC (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/689,390

(22) Filed: Nov. 20, 2019

(65) Prior Publication Data
US 2020/0157384 A1  May 21, 2020

Related U.S. Application Data (60) Provisional application No. 62/780,114, filed on Dec. 14, 2018, provisional application No. 62/769,995, filed on Nov. 20, 2018.

(51) Int. Cl.
*C09J 7/29*      (2018.01)
*B33Y 10/00*   (2015.01)
(Continued)

(52) U.S. Cl.
CPC ............... *C09J 7/29* (2018.01); *B29C 64/153* (2017.08); *B33Y 10/00* (2014.12); *B33Y 70/00* (2014.12);
(Continued)

(58) Field of Classification Search
CPC ..... C09J 7/29; C09J 7/205; C09J 7/203; C09J 7/30; C09J 7/50; C09J 2301/20;
(Continued)

(56) References Cited

U.S. PATENT DOCUMENTS

| 5,789,123 A | 8/1998 | Oleckner et al. |
| 10,926,459 B2 | 2/2021 | Achten et al. |

(Continued)

FOREIGN PATENT DOCUMENTS

| WO | 2004/050262 | 6/2004 |
| WO | 2016/162052 | 10/2016 |

(Continued)

OTHER PUBLICATIONS

International Search Report and Written Opinion dated Feb. 24, 2020 issued in IA No. PCT/US2019/062359 filed Nov. 20, 2019.
(Continued)

*Primary Examiner* — Patricia L. Nordmeyer
(74) *Attorney, Agent, or Firm* — Avery Dennison Retail Information Services LLC (57) ABSTRACT

A heat transferable label component for a garment or other clothing item or article is disclosed which is preferably produced using all digitally controlled manufacturing methods. The label component comprises a carrier layer, a release layer, an optional primer layer, a color design layer, a transition layer and at least one adhesive layer. The color design layer displays an image on the label, and the transition layer fixates the image and renders it wash and/or wear resistant. The at least one adhesive layer is positioned on the transition layer, and is preferably applied thereto via a selective laser sintering (SLS) process, wherein a powder layer is spread on the surface and fused with a laser. The adhesive layer can be a double layer comprising a white reactive adhesive layer that undergoes a crosslink reaction to become a thermoset and a substantially clear thermoplastic adhesive layer.

16 Claims, 4 Drawing Sheets

(51) Int. Cl.
*B33Y 70/00* (2020.01)
*B33Y 80/00* (2015.01)
*B29C 64/153* (2017.01)
*C09J 7/20* (2018.01)
*C09J 7/30* (2018.01)
*G09F 3/10* (2006.01)
*C09J 7/50* (2018.01)
*G09F 3/02* (2006.01)
*B29K 101/10* (2006.01)
*B29K 105/00* (2006.01)
*B29L 31/00* (2006.01)

(52) U.S. Cl.
CPC .............. *B33Y 80/00* (2014.12); *C09J 7/203* (2018.01); *C09J 7/205* (2018.01); *C09J 7/30* (2018.01); *G09F 3/10* (2013.01); *B29K 2101/10* (2013.01); *B29K 2105/0097* (2013.01); *B29K 2995/002* (2013.01); *B29L 2031/744* (2013.01); *C09J 7/50* (2018.01); *C09J 2203/334* (2013.01); *C09J 2301/10* (2020.08); *C09J 2301/124* (2020.08); *C09J 2301/20* (2020.08); *C09J 2400/22* (2013.01); *G09F 3/02* (2013.01); *G09F 2003/0211* (2013.01); *G09F 2003/0225* (2013.01); *G09F 2003/0257* (2013.01); *Y10T 428/1467* (2015.01)

(58) Field of Classification Search
CPC ... C09J 2203/334; C09J 2400/22; G09F 3/10; G09F 3/02; G09F 2003/0211; G09F 2003/0257; G09F 2003/0225; G09F 2003/124; G09F 2003/10; B33Y 10/00; B33Y 70/00; B33Y 80/00; B29C 64/153; B29C 64/245; Y10T 428/1467; B29K 2101/10; B29K 2105/0097; B29K 2995/002; B29L 2031/744; B44C 1/1712
See application file for complete search history.

(56) References Cited

U.S. PATENT DOCUMENTS

2011/0289647 A1* 12/2011 Chiao .................. D06M 17/00
                                                              2/69
2015/0290877 A1* 10/2015 Darland ................ C09J 131/04
                                                              428/195.1
2016/0107375 A1    4/2016 Ohnishi et al.
2018/0291239 A1   10/2018 Franke et al.

FOREIGN PATENT DOCUMENTS

WO    2017/116678    7/2017
WO    2018/046739    3/2018
WO    2019/175525    9/2019

OTHER PUBLICATIONS

International Preliminary Report on Patentability dated May 25, 2021 issued in IA No. PCT/US2019/062359 filed Nov. 20, 2019.

* cited by examiner

DIGITALLY PRODUCED LABEL TRANSFER USING SELECTIVE LASER SINTERING (SLS) METHODS

CROSS-REFERENCE TO RELATED APPLICATION(S)

The present application claims priority to and the benefit of U.S. provisional patent application No. 62/769,995 filed Nov. 20, 2018 and U.S. provisional patent application No. 62/780,114 filed Dec. 14, 2018, each of which is incorporated herein by reference in its entirety.

BACKGROUND

The present invention relates generally to the production of heat transferable labels for garments and other items, preferably using all digitally controlled manufacturing methods. More specifically, the system produces heat transferable labels using selective laser sintering (SLS) methods. The label component of the present invention is particularly suitable for garments and other clothing items. Accordingly, the present specification makes specific reference thereto. However, it is to be appreciated that aspects of the present invention are also equally amenable to other label applications and carriers or substrates.

Heat-transfer labels are implements commonly used to decorate and/or to label commercial articles including, without limitation, garments, containers for beverages, essential oils, detergents, adverse chemicals, as well as health and beauty aids. As can readily be appreciated, heat-transfer labels are desirably resistant to wear, wash, abrasion and chemical effects in order to avoid a loss of label information and/or quality, and desirably possess good adhesion to the articles to which they are affixed. Heat-transfer labels are typically manufactured as part of a heat-transfer label assembly, with one or more heat-transfer labels printed on a removable carrier web.

Heat transferable labels are in widespread use in the textile industry. For example, such labels are commonly used to transfer indicia formed from ink or other suitable materials onto many fabrics to produce or describe cleaning instructions, sizes, fabric composition, and decoration to name just a few. Typically, labels include thermoplastic inks and/or adhesives that are heat-activated to adhere the label to a fabric or other carrier or substrate. Because of ease of application, aesthetics, and their desirable characteristics and properties, to a large extent, heat transferable labels have replaced sewn-on patches in many fabric applications, especially for tee shirts and undergarments.

Additionally, printed labels are well-known and commonly used to transfer a graphic, such as text or a figure, onto an item, such as apparel or other merchandise. Printed labels are usually pre-printed with a graphic and/or text, and then the graphic and/or text is transferred from the label to the item or other substrate using a heated pad or iron or the like. Printing techniques such as gravure printing, offset printing, flexographic printing, screen printing and digital printing can all be used to create a heat transfer label. More specifically, the text or graphic is typically formed on a web or other substrate onto which a release layer is applied. The ink graphic is applied to the release layer, followed by an adhesive, which is applied to the top surface of the text and/or graphic. When a user then applies the text and/or graphic to the item, the label is placed adhesive-side down onto the item and heat is applied to the back of the label substrate to transfer the text and/or graphic to the item from the release layer of the label substrate.

Unfortunately, this composition of ink and adhesive is not efficient, as each layer of the text and/or graphic must be mixed and applied separately. More specifically, the ink and the adhesive cannot be mixed together and applied in one stroke as the ink and the adhesive need to maintain different chemical characteristics. For example, labels on garments must be stretchable, water/wash resistant, and chemical dry-cleaning resistant. For these reasons, the ink used in the graphic must be cross-linked to form a 3-dimensional network. By comparison, the adhesive cannot be cross-linked, and typically must be capable of being thermally activated and heat sealable in order for the user to transfer the graphic from the label to the substrate or item, such as a garment. Accordingly, the ink and the adhesive cannot be combined in one mixing pot as the mixture may result in the adhesive losing its thermoplastic characteristics. Further, the resulting graphic and adhesive layer can result in a halo around the graphic portion of the label, which can be aesthetically undesirable and result in the creation of unnecessary waste, which is also undesirable and inefficient.

Therefore, there exists in the art a long felt need to manufacture a digitally printed heat transferable label using a more efficient process that results in the creation of less waste, as well as a manufacturing process that prevents or reduces the likelihood of halos. The label component and more efficient manufacturing method of the present invention would replace the existing multistep manufacturing process and would comprise adding adhesive powder to a digital image printed on a substrate to produce a multi-color photographic quality label for the apparel and other industries.

More specifically, the present invention discloses a heat transferable label component for a garment or other clothing item which is preferably produced using all digitally controlled manufacturing methods. The label component preferably comprises a carrier layer, a release layer positioned atop of the carrier layer, a primer layer, a color design layer, and a transition layer. The color design layer displays text and/or an image on the label and the transition layer acts as a coating to fixate the text and/or image and render it wash and wear resistant. An adhesive layer is then positioned on the transition layer, and is preferably applied via a selective laser sintering (SLS) process, wherein a powder layer is spread on the surface and fused with a laser, such as a $CO_2$ laser.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, preferably comprises a heat transferable label component for a garment or other clothing item or substrate which is produced using all digitally controlled manufacturing methods. The label component preferably comprises a carrier layer, a release layer positioned on top of the carrier layer, and a color design layer positioned on top of the release layer. The color design layer displays an image, such as text and or a design graphic, on the label. A transition layer is then applied as a coating to fixate the image on the color design layer. An adhesive layer is then positioned on the transition layer so that the label component may be applied to an article such as a garment. The adhesive layer is preferably applied via a selective laser sintering (SLS) process, wherein a powder layer is spread on the surface and fused with a laser, such as a $CO_2$ laser.

In a preferred embodiment of the present invention, the color design layer may further comprise a spot color toner to enhance the features of the image (i.e., text or other design graphic). The spot color toner is preferably comprised of a clear or white toner printed on the image. Optionally, the label component can further comprise a primer layer positioned between the release layer and the color design layer. The primer layer is particularly useful for receiving a toner image, and may be printed or coated to cover all or substantially all of the release layer.

Additionally, the adhesive layer may be a double layer comprising a first white reactive adhesive layer and a second clear thermoplastic adhesive layer. The first white adhesive layer may undergo a crosslink reaction via a laser and become a thermoset. The first white reactive adhesive layer and the second clear thermoplastic adhesive layers may be both applied via a SLS process.

A method of manufacturing the label component of the present invention for use with, for example, a garment is also disclosed. The method preferably comprises providing a carrier layer, a release layer, and a primer layer all layered on top of each other. A color design layer is then applied via xerographic printing to the top surface of the primer layer. Typically, the xerographic printing process is a wet or liquid xerographic printing process. A transition layer is then applied as a coating to the color design layer to fixate the toner image and render it wash and/or wear resistant. A first white reactive adhesive layer is then applied to the transition layer, preferably via a SLS process; and a second clear thermoplastic adhesive layer is applied via the SLS process on top of the first white reactive adhesive layer. The first white reactive adhesive layer is then crosslinked via a laser to create a thermoset.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

In one embodiment, the present invention discloses a heat transferable label component for a garment or other clothing item which is produced using all digitally controlled manufacturing methods. The label component preferably comprises a carrier layer, a release layer, a primer layer, a color design layer, and a transition layer. The color design layer displays an image (e.g., a text and/or design graphic) on the label and the transition layer acts as a coating to fixate the image on said label. An adhesive layer may then be positioned on the transition layer. The adhesive layer is preferably applied via a selective laser sintering (SLS) process, wherein a powder layer is spread on the surface of the transition layer and fused with a laser, such as a $CO_2$ laser.

In another embodiment, the color design layer may further comprise a spot color toner to enhance the features of the image (e.g., text or graphic). The spot color toner preferably comprises a clear or white toner printed on the image so as to not detract from the graphical quality of the image. Additionally, the adhesive layer can be a double layer adhesive comprising a first white reactive adhesive layer and a second clear thermoplastic adhesive layer. The first white adhesive layer may undergo a crosslink reaction via a laser and becomes a thermoset. The first white reactive and the second clear thermoplastic adhesive layers are both preferably applied via a selective laser sintering (SLS) process.

Figure 1:
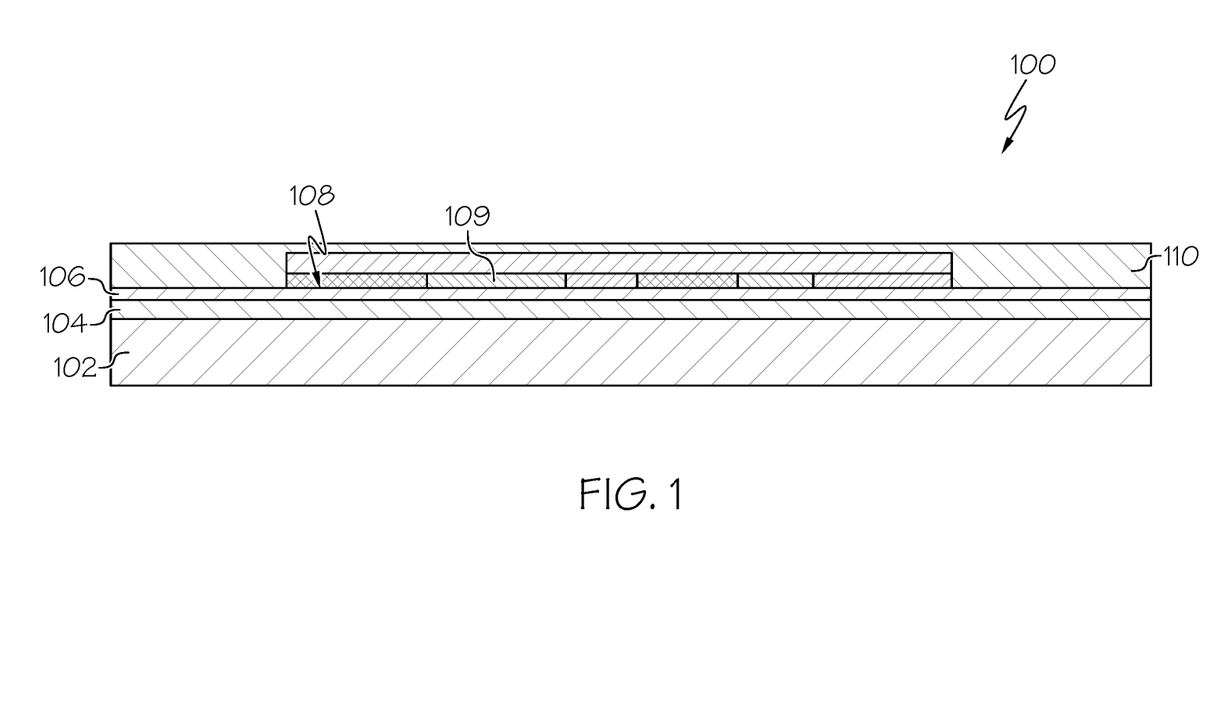
FIG. 1 illustrates an elevational view of a label component before the application of the adhesive and white backing in accordance with the disclosed architecture.

Referring initially to the drawings, FIG. 1 illustrates an elevational view of a label component 100 for a garment or other clothing item or article. The label component 100 is typically a heat transferable label but can be any suitable label as is known in the art. Further, label component 100 can be any suitable size, shape, and/or configuration as is known in the art without affecting the overall concept of the invention. One of ordinary skill in the art will appreciate that the shape, size, configuration and contents of the label component 100 shown in FIG. 1 is for illustrative purposes only, and that many other shapes, sizes, configurations and graphical contents of the label component 100 are well within the scope of the present disclosure. Although the dimensions of the label component 100 (i.e., length, width, and height) are important design parameters for good performance, the label component 100 may be any shape or size that ensures optimal performance during use.

Typically, the label component 100 is a heat transferable label comprised of a plurality of layers which are produced using digitally controlled manufacturing methods as is known in the art, and each of which are more fully described below. For example, the label component 100 comprises a label carrier layer 102. The label carrier layer 102 is preferably comprised of a plastic film or a specialty paper such as polyethylene terephthalate (PET) film. Typically, the label carrier layer 102 is approximately between 4 mil to 100μ thick of PET film, or any other suitable size as is known in the art. Furthermore, in a preferred embodiment, the label carrier layer 102 also comprises a matte release layer that may be coated onto one or both sides of the PET film. The matte release layer is preferably made by using a thermoset coating filled with a matting agent. The thermoset coating chemistry can be 2K polyurethane, acrylics, or formaldehyde free melamine resins, or any other suitable composition as is known in the art. By way of example, a 2K polyurethane is a high performance 2 k poly compliant coating consisting of an acrylic modified pigmented base coupled with an isocyanate polymer based hardener, which provides a tough and durable mirror-like gloss film with excellent chemical and solvent resistance coupled with very fast drying and rapid cure.

Further, examples of PET films used in the label carrier layer 102 are SMARTRANS films of Hanse Korea Corporation: KP44GR, which is a high glossy film; KP44LMTGR, wherein one side of the film is relatively glossy and the other side is relatively matte and a lighter level releasing agent is applied on the matte side; KP44MTCGR, wherein one side is relatively glossy and the other side is matte with an anti-curling coating for anti-curling, and a medium level releasing agent is applied on the matte side; and KP44BMT, wherein both sides of the film have a matte medium level releasing agent already applied thereto.

The label carrier layer 102 is preferably printed or coated with a release layer 104. The release layer 104 can be based on a water or solvent carrier and include one or more of the following ingredients: a wax solution, a wax dispersion, a polymeric binder that holds the wax particles into a film, additives for wetting and defoaming as well as rheology modifiers and co-solvents, or any other suitable materials as is known in the art.

The waxes preferably used in release layer 104 would melt at or above the processing temperature that is used inside the xerographic printers. For example, the waxes would melt at temperatures greater than 110° C., preferably greater than 120°, and more preferably greater than 140° C. The release layer 104 could also comprise other thermoplastic polymer binders having a lower melt index (or higher melt viscosity) than that of the waxes. Further, release inks for the xerographic printers include a screen printable HD ink, a product that is manufactured by Avery Dennison NTP of Gaupne, Norway.

The label component 100 may further comprise a primer layer 106. This is an optional layer that is able to receive the toner image and is printed or coated to cover all or substantially all of the release layer 104. The primer layer 106 also functions as an insulator or barrier for the waxes present in release layer 104 that could otherwise contaminate the printer parts involved in the toner transfer. The primer layer 106 is essential in receiving and adhering the liquid toner on polymeric film substrates such as polyethylene terephthalate (PET), polycarbonate (PC) or polypropylene (PP).

Primer polymeric materials would include copolymers of acrylic acid and methacrylic acid and their alkyl esters. The primer polymeric materials may also include copolymers of ethylene and propylene with acrylic or methacrylic acid. One such material is a water-based dispersion of polyethylene acrylic acid that is sold by Michelman of Cincinnati, Ohio under the commercial name of Michem® Prime 4983, though it is contemplated that other water-based dispersions of polyethylene acrylic acids may also be used without affecting the overall concept of the present invention.

Solvent based primers are also used for polymeric substrates an are basically solutions of polyamides dissolved in alcohol. One such solution is sold by Michelman of Cincinnati, Ohio under the trade name Topaz. Other nitrogen containing primers based on amine groups include polyethylene amine or polyaziridine that is created from a cationic water-based salt solution and is coated on paper or fabric substrates.

The label component 100 is also preferably printed or coated with a color design layer 108. Preferably, the color design layer 108 is commonly generated by xerographic or electrographic printing, though other similar printing techniques may also be used without affective the overall concept of the present invention. The xerographic or electrographic printing can be either 'dry' or 'wet'. In 'dry' xerographic printing, an electrostatic image (e.g., text and or design graphic) is created on a photo-conducting drum or belt. The image 109 is developed using a pigmented dry powder or toner and then transferred to a substrate which could be a film or a paper. The image 109 is subsequently fused onto the substrate when the image is fixated.

Examples of preferred dry toner printing include using Oki technology and include the digital transfer printer line: C711WT, C831TS, Pro6410 NeonColor, etc., or any other suitable printing technology as is known in the art. Furthermore, some of these printers are also able to print special spot colors such as fluorescents, metallics, and white backers, or any other suitable special colors as is known in the art.

In 'wet' xerography, an electrostatic ink composition comprising charged toner particles in a carrier liquid can be brought into contact with the selectively charged photoconductive surface. The charged toner particles adhere to the image areas of the latent image while the background areas remain clean. The image 109 is then transferred to a print substrate directly or via an intermediate transfer member, which can be a soft silicone blanket. The blanket carrying image is then contracted with the final substrate to transfer the image (e.g., a text or a graphic).

The preferred method of digital printing is via wet or liquid xerography (or electrography). The polymers and charge adjuvants used in liquid xerography have been described above. The color design layer 108 is preferably printed on the substrates of the label carrier layer 102 using a digital color profile. Further, there are also spot color toners that could be printed on the label carrier layer 102 to enhance certain image features. For example, HP Indigo Series 2 could optionally print a clear or white toner as a backer layer on top of the color image 109 to provide better opacity or enhanced adhesion of other coatings.

Finally, the label component 100 can include one or more transition layers 110. The transition layers 110 are coatings that function to fixate the toner image 109 and render it wash and/or wear resistant. Many liquid toners are based on polymers with acid functionality, thus it is important for the polymers in the transition layer 110 to be compatible with those from the toner and for the polymers to be able to cross link when a cross linker is added prior to printing.

Preferred polymers for the transition layers 110 include copolymers of acrylic acid and methacrylic acid and their alkyl esters. The primers would also include copolymers of ethylene and propylene with acrylic acid. One example is a 33% ammonia solution of polyethylene acrylic acid offered for sale by Michelman, Inc. of Cincinnati, Ohio and sold commercially under the name of Michem® Prime 4990R.

This primer material could be cross linked by various entities. Preferred cross linkers include polyaziridine (XR2500), epoxy silane such as GLYMO (3-Glycidyloxypropyl trimethoxysilane), and colloidal metal oxides such as ZnO.

The transition layers 110 could be delivered on the toner digital image by ink printing, coating, and spray coating. If ink printing is used then ink screen printing is preferred, but flexo or gravure printing can also be used. By way of example, in a gravure printing process, an image is acid-etched on the surface of a metal cylinder, typically one cylinder for each color, in a pattern of cells. The cells are typically recessed into the cylinder at different depths, unlike relief printing or letterpress where the printing image is raised or like offset printing, in which the image is level with the plate. The cells hold the ink that is transferred to the substrate. The dimensions of the cells must be precise because the deeper cells produce more intensive color than shallow cells. The cells are filled with ink, and the non-printing portions of the plate or cylinder are wiped or scraped free of ink. Then the substrate is pressed against the inked cylinder on a rotary press, and the image is transferred directly to the substrate. The engraved cylinder typically sits partially immersed in the ink fountain, where it picks up ink to fill its recessed cells on each rotation of the press.

If, on the other hand, a coating is used, then a Mayer rod and/or rotogravure coating is preferred. For example, a Mayer rod is typically a stainless steel rod that is wound tightly with stainless steel wire of varying diameter. The Mayer rod is used to handle the excess coating solution and control the coating weight. By comparison, a rotogravure coating process involves a rotary press with intaglio cylinders, typically running at high speed and used for long print runs.

Further, the preferred liquid vehicle for the transition layer 110 is water, but could also include additives, such as wetting or deformers, rheology modifiers, and co-solvents, or any other additives as is known in the art. One preferred wetting agent for the water-based transition layers 110 is a silicone glycol block copolymer commercially available from Evonik Industries of Essen, Germany under the trade name TEGO® Wet 270. Further, the transition layer ink is cured first by evaporation of the solvent vehicle and then by a curing reaction, preferably at a temperature of between 90° C. and 130° C. for one minute, or by any other curing method as is commonly known in the art. The label component 100 shown in FIG. 1 discloses the structure before the application of adhesive layers and white backing layers.

Figure 2A:
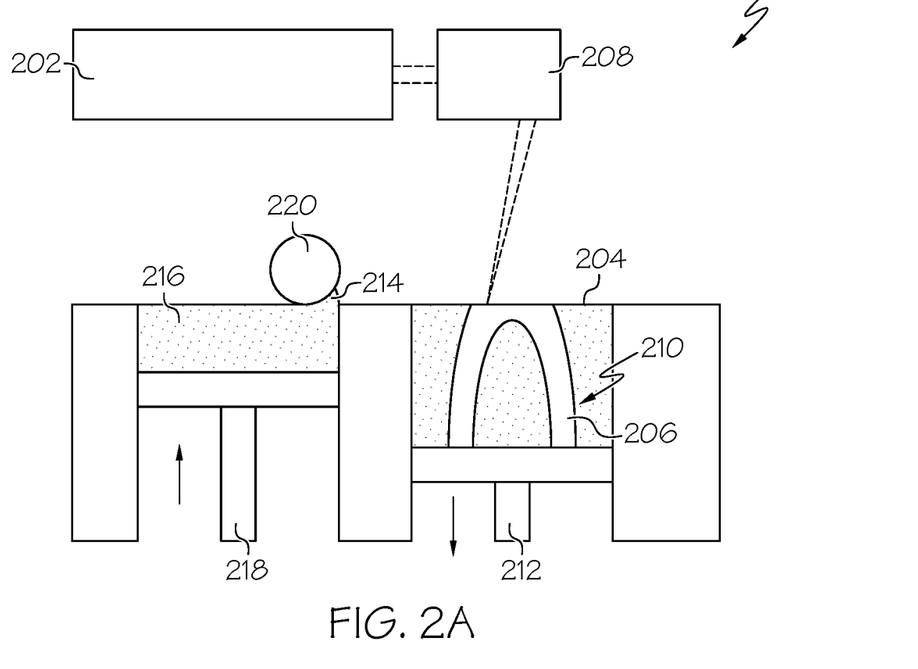
FIG. 2A and FIG. 2B illustrate a side perspective view of the SLS printing process in accordance with the disclosed architecture.
Figure 2B:
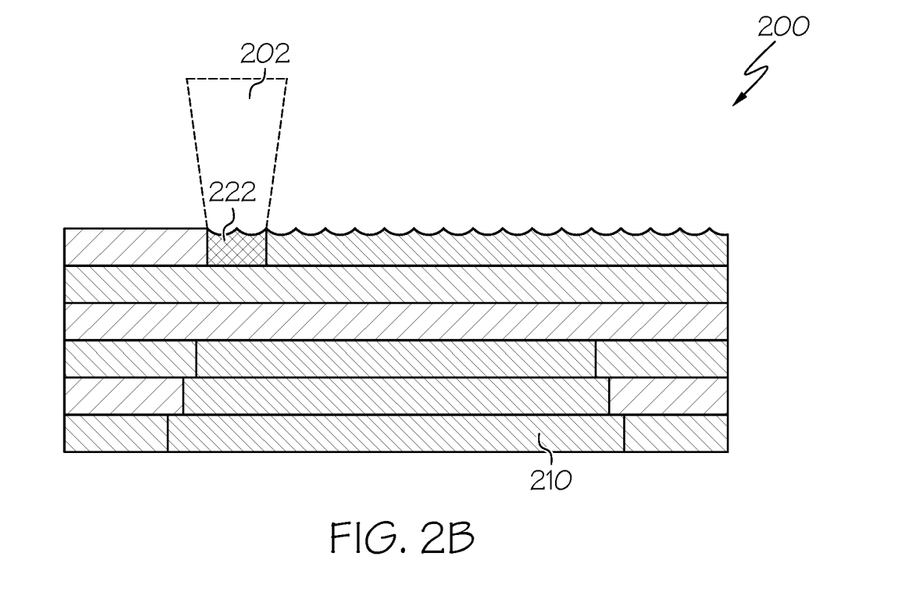

The adhesive application for the label component 100 is typically performed via selective laser sintering (SLS), which is generically illustrated in FIG. 2. Stated generally, selective laser sintering is an additive manufacturing (AM) technique that uses a laser as the power source to sinter powdered material (typically nylon/polyamide), aiming the laser automatically at points in space defined by a three dimensional (3D) model, and binding the material together to create a solid structure. The SLS printing process 200 is a powerful 3D printing technology that produces highly accurate and durable parts that are capable of being used directly in end-use, low-volume production, or for rapid prototyping. An additive manufacturing layer technology, SLS involves the use of a high-power laser 202 (for example, a carbon dioxide laser) to fuse small particles of plastic powders 204 into a mass 206 that has a desired three-dimensional shape. More specifically, powder particles 204 are taken from a powder delivery system 216 wherein a powder delivery piston 218 pushes up the powder particles 204 which are then moved to the fabrication powder bed 210 via a roller 220. The laser 202 selectively fuses 222 powdered material 204 by scanning 208 cross-sections generated from a 3D digital description of the part (for example, which may originate from a computer aided drafting (CAD) file or scanned data) on the surface of a powder bed 210. After each cross-section is scanned, the powder bed 210 is lowered by one-layer thickness via a fabrication piston 212 or other suitable device, a new layer of material 214 is applied on top of the previous layer, and the process is repeated until the part 206 is completed.

The SLS process may also be utilized for digital heat transfers. First, the base sheet is made using the image color process for the heat transfer label 100 as shown in FIG. 1. Specifically, the heat transfer label component 100 comprises: a carrier layer 102; a release layer 104 positioned on top of the carrier layer 102; a primer layer 106 positioned on top of the release layer 104; and a color design layer 108 positioned on the release layer 104. The color design layer 108 displays a toner image 109 on the label. A cross-linkable transition layer 110 is applied as a top coating to insure the polymer toner image 109 is fixated and resistant against washing and/or wear. For example, the transition layer 110 may have a grams per square meter rate of 0.1-5 gsm<0.5-3 gsm<0.5-1 gsm, and a chemistry of polyethylene acrylic or methacrylic acid, polypropylene acrylic or methacrylic acid, styrenated acrylics with acid groups, styrene butadiene rubbers with acrylic groups, acrylics with acid groups that are cross linked by polyaziridine, epoxy, epoxy silane, Zn, Zr, and/or Ti chelates.

Figure 3:
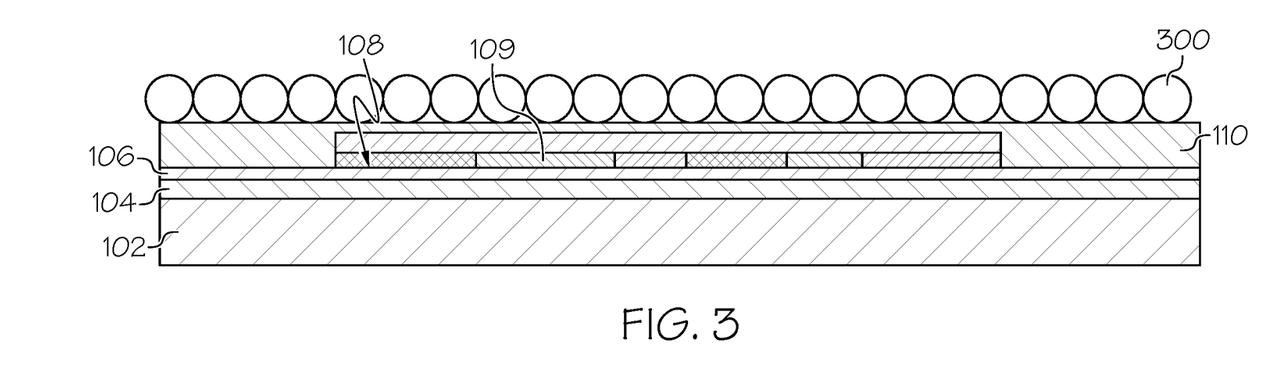
FIG. 3 illustrates an elevational view of the label component with the adhesive application as a powder layer in accordance with the disclosed architecture.

As shown in FIG. 3, a powder adhesive 300 is then applied as a powder via a scatter process or via a powder coating process, such as a roll or knife coating. Typically, one or several layers of adhesive particles may be applied. The adhesive is preferably a thermoplastic polymer that has a melt index (MI) of between 10-80 g/10 min@ 190° C., and that softens at 90-160° C., and preferably has a chemistry comprised of polyurethane, polyester, polyamide, etc. Further, the particle size distribution of the adhesive is preferably: 0-200µ<80-200µ<10-100µ<30-70µ, and the adhesive powder 300 may comprise a white pigment in it for which case the adhesive provides or supplements the backing opacity for the color image 109.

Figure 4:
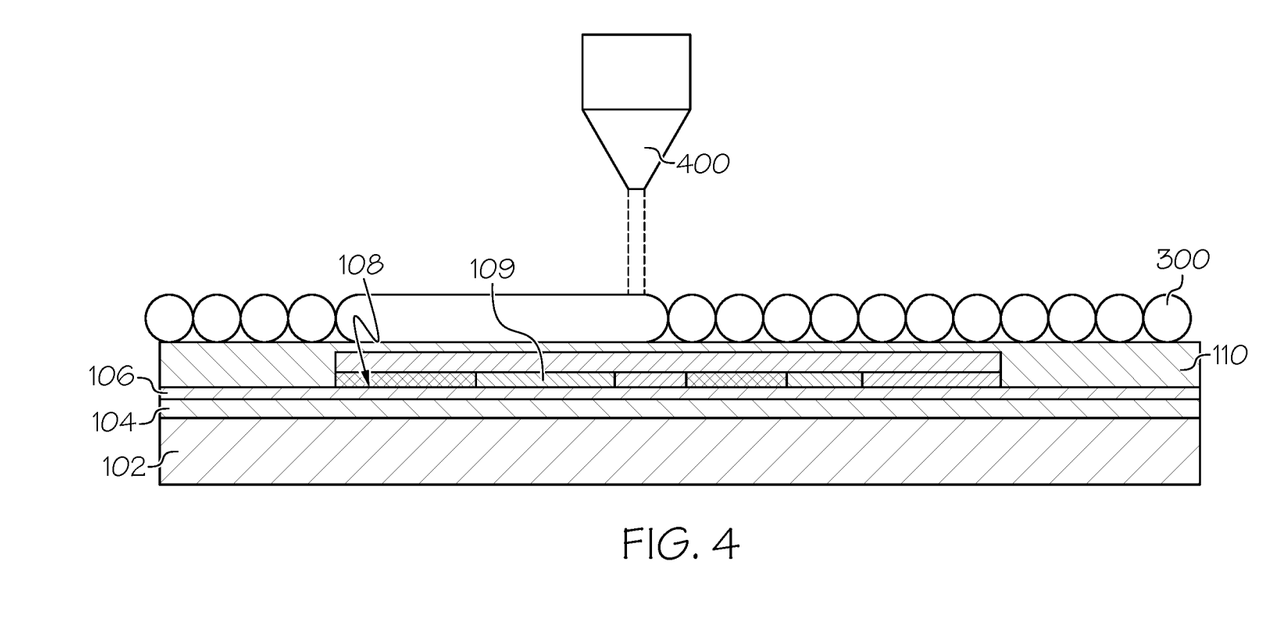
FIG. 4 illustrates an elevational view of the label component wherein the adhesive layer is fused and fixated by laser heating in accordance with the disclosed architecture.
Figure 5:
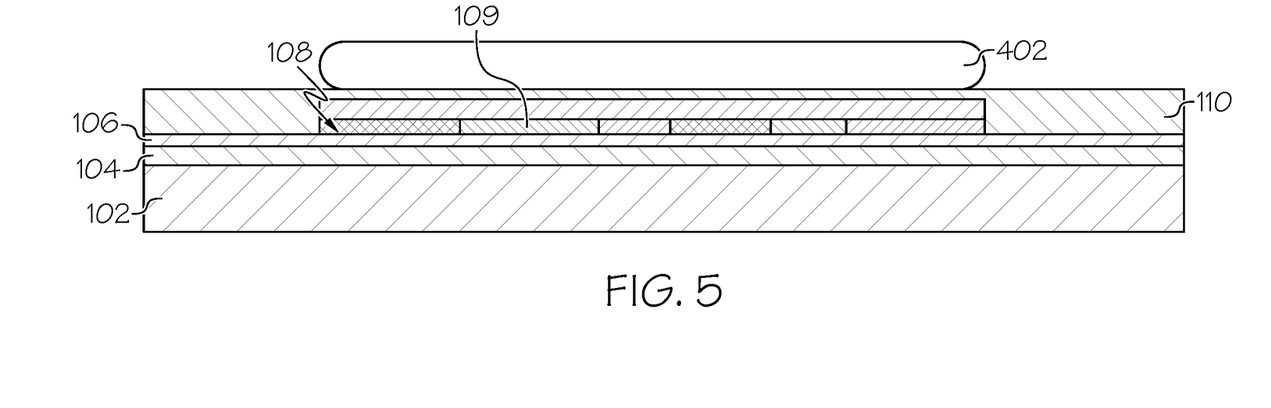
FIG. 5 illustrates an elevational view of the label component wherein excess powder is removed, thereby leaving only the fused adhesive design in accordance with the disclosed architecture.

As shown in FIGS. 4-5, in the SLS process the laser 400 is turned on to fuse only the adhesive particles 402 that cover the image 109 in the color design layer 108. The fusion is done at the pixel/particle level. The SLS laser 400 is in register with the substrate image 109. Furthermore, a laser printer (not shown) could be helped by register cameras (also not shown) that read eye mark points printed by the laser printer. The SLS laser 400 is typically a $CO_2$ type laser in pulse mode and is composed of a beam width of 20µ<40µ<80µ. Additionally, the adhesive art may overhang the digital art by 0.1 to 0.3 mm, which is particularly useful if the adhesive is clear. In contrast, the adhesive art may undercut the digital art by 0.1 to 0.2µ, which is particularly desirable if the adhesive is pigmented with white $TiO_2$.

Figure 6:
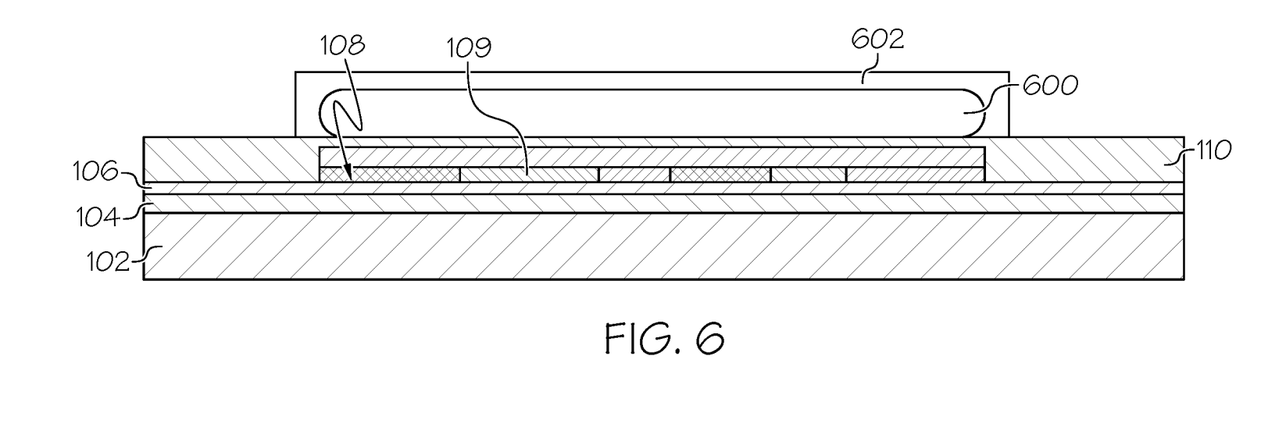
FIG. 6 illustrates an elevational view of the label component with a double layer adhesive layer comprising a white reactive adhesive layer that has been thermoset by a laser and a clear thermoplastic adhesive layer in accordance with the disclosed architecture.

As shown in FIG. 6, it is also possible to use a combination of adhesives such as a double layer adhesive comprising a white reactive adhesive 600 that has been thermoset by a laser and a clear thermoplastic adhesive 602. For example, a white adhesive 600 that is fused to undercut the image (0.1 to 0.2 mm) 109 and on top a clear adhesive 602 that is fused with an overhang (halo) to the image (0.1 to 0.3 mm) 109. The white adhesive 600 may be a reactive adhesive that undergoes a cross link reaction and becomes a thermoset. Examples of such adhesives include, but are not limited to: Rowalit® 1001 available from ROWAK AG in Zurich, Switzerland, Dakota Unex 409 available from Dakota Coatings Inc. in Charleston, N.C., Schaetti SXL Series available from Schaetti AG of Zurich, Switzerland, etc., or any other suitable thermoset adhesives as is known in the art. The approach that uses a white thermoset—clear thermoplastic adhesive would insure a white backing that is not distorted by heat application or flow in the fabric upon label bonding.

A method of manufacturing a heat transferable label component 100 for a garment or other article or product is also disclosed. The method of manufacture preferably comprises providing a carrier layer 102 that is a plastic film or a specialty paper. A release layer 104 is then printed or coated onto the top surface of the carrier layer 102. Optionally, a primer layer 106 can be included, which may be printed or coated to cover all of or substantially all of the release layer 104. A color design layer 108 is then applied via xerographic printing to the top surface of the primer layer 106. Typically, the xerographic printing process is a wet or liquid xerographic printing process. Each of the various layers, their preferred compositions and other properties are described more fully above.

Specifically, an electrostatic ink composition comprising charged toner particles in a carrier liquid can be brought into contact with the selectively charged photoconductive surface. The charged toner particles adhere to the image areas of the latent image while the background areas remain clean. The toner image is then transferred to a print substrate directly or via an intermediate transfer member, such as a soft silicone blanket. A transition layer 110 is then applied to the color design layer 108. The transition layer 110 functions as a coating that fixates the toner image and renders it wash and/or wear resistant.

Further, an adhesive layer 600 is then applied to the transition layer 110 via a SLS process. The adhesive layer is a powder adhesive that is applied as a powder via a scatter process or via a powder coating process. The powder adhesive is then fused and fixated by a laser heating and excess powder is removed leaving only the fused adhesive design. It is also possible to use a combination of adhesives. If a combination of adhesives is used, then a first white reactive adhesive layer is applied as a powder and then crosslinked via a laser to create a thermoset. A second clear thermoplastic adhesive layer is then applied via the SLS process on top of the first white reactive adhesive layer. This would insure a white backing that is not distorted by heat application or flow in the fabric upon label bonding.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A label component comprising:
a carrier layer;
a release layer positioned on top of the carrier layer;
a color design layer positioned on top of the release layer and comprising an image; and
a first adhesive layer positioned on top of the color design layer, wherein the first adhesive layer is applied to the color design layer via a selective laser sintering process, and the first adhesive layer is a white reactive adhesive; and
a second adhesive layer positioned on top of the first adhesive layer via a selective laser sintering process, wherein the second adhesive layer is a substantially clear thermoplastic adhesive.

2. The label component of claim 1 further comprising a primer layer positioned between the release layer and the color design layer.

3. The label component of claim 1 further comprising a transition layer positioned on top of the color design layer.

4. The label component of claim 1, wherein the color design layer further comprises a spot color toner.

5. The label component of claim 4, wherein the spot color toner comprises a substantially clear toner printed on the image.

6. The label component of claim 4, wherein the spot color toner comprises a white toner printed on the image.

7. The label component of claim 1, wherein the adhesive layer comprises a powder layer.

8. The label component of claim 7, wherein the powder layer is fused via a laser.

9. The label component of claim 1, wherein the laser is a $CO_2$ laser.

10. The label component of claim 1, wherein the white reactive adhesive undergoes a crosslink reaction via a laser to become a thermoset.

11. A label component for a garment comprising:
a carrier layer;
a release layer positioned on top of the carrier layer;
a primer layer positioned on top of the release layer;
a color design layer positioned on top of the primer layer and which comprises an image;
a transition layer positioned on top of the color design layer; and
a double adhesive layer positioned on top of the transition layer,
wherein the double adhesive layer is applied to the transition layer via a selective laser sintering process,
wherein a first adhesive layer of the double adhesive layer is a white reactive adhesive, and
wherein a second adhesive layer of the double adhesive layer is a substantially clear thermoplastic adhesive.

12. The label component of claim 11, wherein the color design layer further comprises a spot color toner.

13. The label component of claim 12, wherein the spot color toner comprises a substantially clear or white toner printed on the image.

14. A method of manufacturing a label component comprising:
providing a carrier layer;
positioning a release layer positioned on top of the carrier layer;
positioning a color design layer on top of the release layer, the color design layer comprising an image; and
positioning a first adhesive layer on top of the color design layer, wherein the first adhesive layer is applied to the color design layer via a selective laser sintering process, and the first adhesive layer is a white reactive adhesive; and
positioning a second adhesive layer on top of the first adhesive layer via a selective laser sintering process, wherein the second adhesive layer is a substantially clear thermoplastic adhesive.

15. The method of manufacturing a label component of claim 14, wherein the color design layer is positioned on the primer layer using a xerographic printing process.

16. The method of manufacturing a label component of claim 14 further comprising crosslinking the at least one adhesive layer via a laser to create a thermoset.

* * * * *